May 19, 1970 R. H. KERHAN 3,512,564
PROCESS AND MACHINE FOR CONDITIONING SUGAR CANE PRIOR
TO THEIR PROCESSING IN THE SUGAR FACTORY
Filed Nov. 16, 1967 2 Sheets-Sheet 1

INVENTOR.
ROBERTO H. KERHAN,
BY
Robert G. McMorrow
ATTORNEY

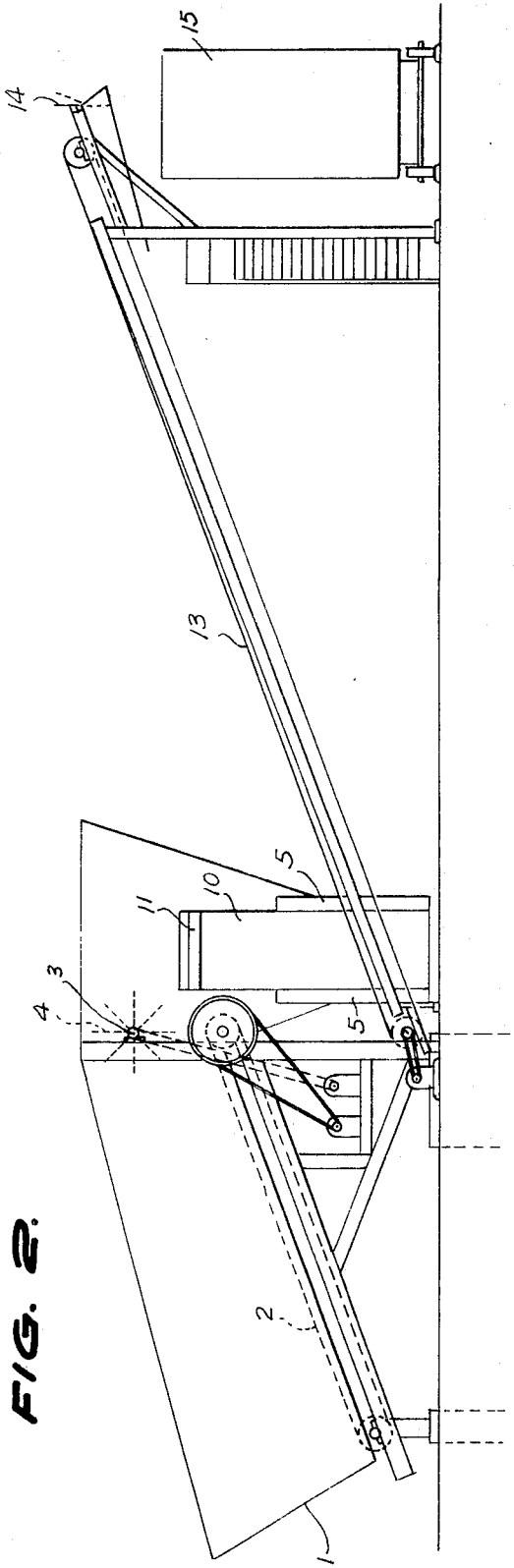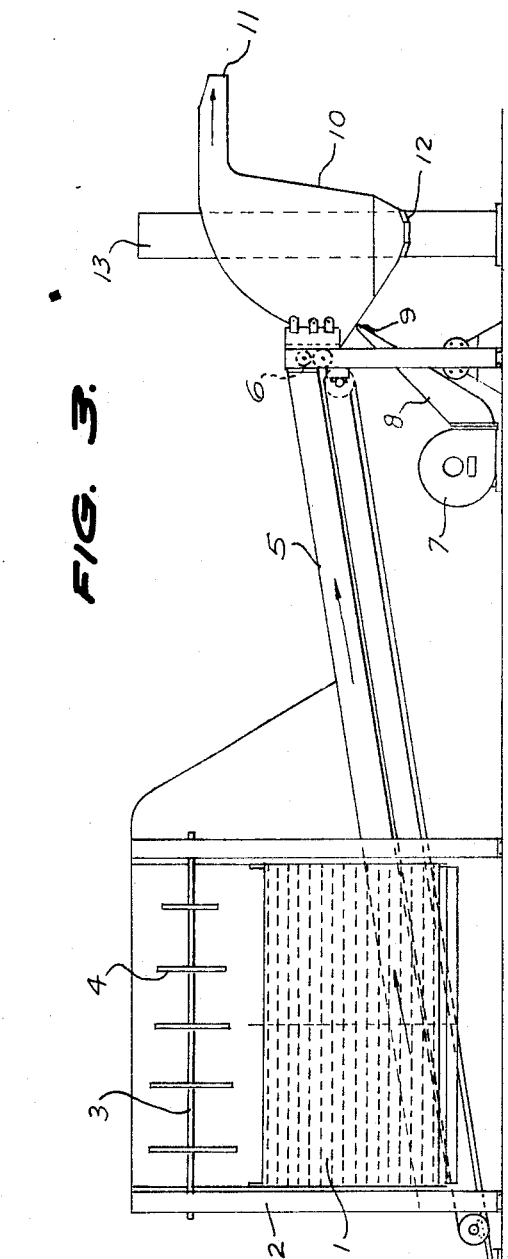

United States Patent Office

3,512,564
Patented May 19, 1970

3,512,564
PROCESS AND MACHINE FOR CONDITIONING SUGAR CANE PRIOR TO THEIR PROCESSING IN THE SUGAR FACTORY
Roberto Henderson Kerhan, 309 10th St., Marianao, Cuba
Filed Nov. 16, 1967, Ser. No. 683,591
Int. Cl. B02c *18/00;* A01d *55/00*
U.S. Cl. 146—119                2 Claims

ABSTRACT OF THE DISCLOSURE

A system for processing of sugar cane in which the harvested cane is placed on a first conveyor and subjected to the action of a series of rigid arms on a cross shaft, deposited on a second conveyor moving at an accelerated rate relative to the first conveyor, cut, and thereafter cleaned by air separation.

---

Figure 1:
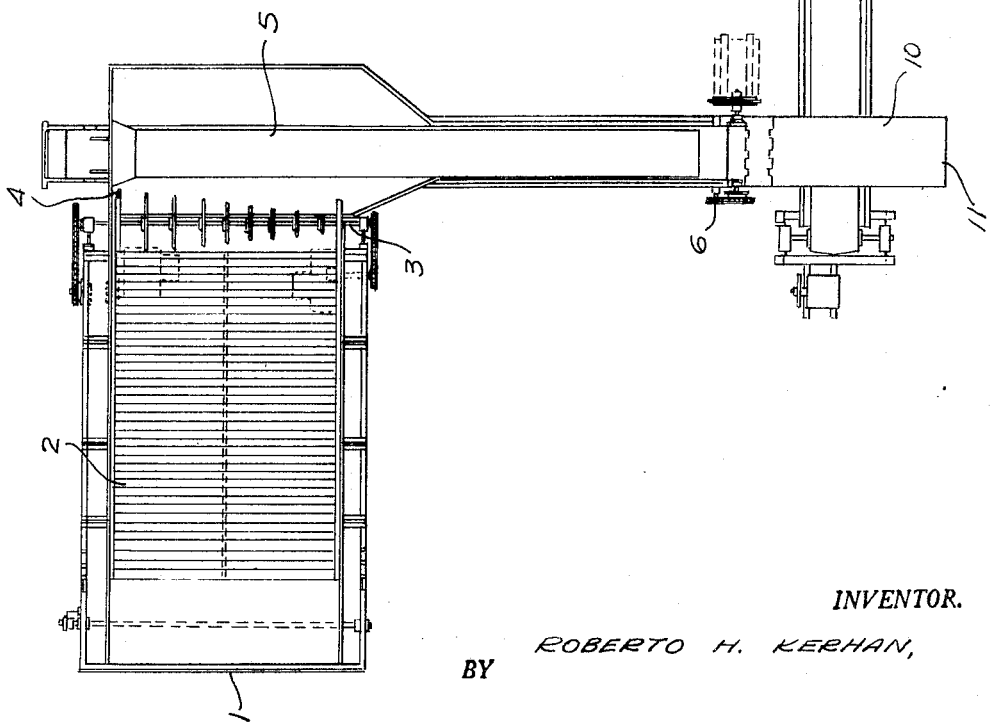

The object of this invention is to provide a process and machine for cleaning sugar canes of the impurities which accompany them, such as leaves, dirt and trash, and for cutting them in short lengths before entering the milling process, with the view of increasing the productivity of the sugar cane cutting laborers and of facilitating the work of the sugar mill.

It is known to all that sugar canes are cut and loaded by hand or by machine; when cut by hand, the cane cutters lose time in removing the leaves which are joined to the cane stalks, and in cutting the canes into shorter lengths. When cut by machines, these leaves, in addition to dirt and trash, remain adhered to the cane in large quantities, which inconvenience is augmented when the canes are mechanically loaded, all of which adversely affects the milling and sugar fabricating process, and all of which are eliminated with the object of this invention.

One advantage of this invention, which has been demonstrated in practice, is that, when sugar cane is cut by hand, the productivity of the cutters is increased by up to 100%, since the cutter is not obliged to clean the canes nor to cut them into shorter lengths.

Another advantage of this invention is that, in cases where the cane fields contain a large quantity of dry leaves, and it is necessary to burn the fields to destroy the trash, this practice is eliminated, and with it, all the damage that is caused to the fields and to the subsequent crops.

Another advantage of this invention is that it eliminates the use of field transfer cranes that transfer the canes from field wagons or trucks to the railway cars that convey the canes to the mill, owing to the fact that this machine is provided with a conveyor which elevates and discharges the canes directly into the railway cars.

Still another very important advantage of this invention is that it conditions the sugar canes, so that these are delivered to the mill completely cleaned and cut into short lengths, by which the capacity and efficiency of the mill is increased, breakages and wear of mills and knives are greatly reduced, the fabrication process is improved, and cleaning periods of mill equipment are lengthened.

Another advantage of this invention is that, owing to the fact that the cane is cleaned and cut into short lengths, the capacity of the transport vehicles is increased, the unloading of these at the mills is greatly accelerated, and a more uniform feeding of the mills is made possible.

Other advantages and particulars of this invention will be seen in this description, especially by experts in this field, and with the aid of the figures shown on the drawings which are attached, in which like numbers represent the same parts in all figures.

This machine is intended to be installed in the field, being located near the cane fields, varying in number and in size according to requirements.

Referring to the drawings, FIG. 1 is a top view of the machine covered by this invention. FIG. 2 is a side view of the same machine, and FIG. 3 is a front view of said machine. The process consists in submitting the canes, such as received from the fields, that is, together with leaves, trash and dirt, to the action of rigid arms mounted on a rotating shaft, in order to separate from them part of said impurities, distributing the canes in a thin and even layer onto a high speed conveyor, passing the canes through a set of knives which cut them into short lengths, submitting the canes to the action of an air blast in order to separate the impurities and the canes, discharge the canes by gravity onto an inclined conveyor which conducts these to a deflector which distributes the canes into the vehicle which convey the canes to the sugar mill.

The machine consists of a hopper 1 into which the canes from the field are deposited, which hopper is provided with a conveyor bottom 2, upwardly inclined, which conveys the canes towards distributing shaft 3 provided with rigid arms 4, located at a predetermined height above the hopper and having a rotating movement, which arms, besides feeding and distributing the canes onto conveyor 5, also separate from the canes part of the leaves attached to them.

It will be observed in FIGS. 1 and 3 that the arms 4 are of variant lengths, and that they are arranged in rows, the lengths being increased from one end of the transverse extent of the conveyor to the other.

Conveyor 5 is a flat rubber belt which runs at high speed, which causes the canes to align themselves along its length in a thin, even layer.

A set of rotating knives 6 consist of two knife-holder shafts rotating in opposite directions, which receive the canes from conveyor 5 and cut them into short lengths, at the same time help to separate impurities still adhering to the cane stalks.

A cleaning section which receives the canes which leave the knives, consisting of a blower 7, actuated by an electric motor, an air duct 8 ending in a nozzle 9 and a separating chamber 10 which has at its upper part an exit opening 11 through which pass air, dirt and leaves which have been separated from the cane and another exit 12 located at the bottom, through which are delivered clean canes, cut into short lengths onto an inclined conveyor 13 which upwardly conveys the canes to deflector 14 which distributes these evenly into the cars or other vehicles 15 which transport the canes to the sugar mill.

Having described this invention I claim as my property that which is contained in the following:

1. A machine for conditioning sugar cane prior to the sugar manufacturing process, the machine comprising:
   a cane receiving hopper having top and bottom portions and forward and rear ends, and receiving harvested lengths of sugar cane through said top portions;
   the bottom portion having a first movable conveyor operatively mounted therein and inclined upwardly from the forward end to the rear end, the conveyor having a discharge end;
   a rotating shaft mounted adjacent the discharge end of the conveyor and having a plurality of rigid arms thereon;
   the shaft extending laterally the full width of the conveyor and being elevated above the conveyor;

a second movable conveyor moved at a speed substantially greater than that of the first conveyor, receiving the cane following contact with the rigid arms;

the second conveyor being mounted in substantially perpendicular relation to the first conveyor, the movement of the first and second conveyers being in substantially perpendicular directions;

a set of rotating knives, comprising a pair of knife holding shafts rotatable in opposite directions, disposed adjacent the discharge end of the second conveyor; and a cleaning section mounted at the end of the second conveyor, including a power-driven blower and a separating chamber, the chamber having an upper exit therein through which air and airborne debris is discharged, and having a bottom exit therein for the sugar cane.

2. The invention of claim 1, wherein:
the rigid arms are of variant lengths; and
the arms are arranged in rows with the lengths increased from one end of the row to the other.

References Cited
UNITED STATES PATENTS

| | | |
|---|---|---|
| 402,082 | 4/1889 | Hughes. |
| 1,663,409 | 3/1928 | Landaiche _____ 130—31 |
| 2,943,629 | 7/1960 | Carruthers _____ 146—98 X |

W. GRAYDON ABERCROMBIE, Primary Examiner

U.S. Cl. X.R.

146—222, 224